United States Patent
Vlaar

(10) Patent No.: US 11,435,026 B2
(45) Date of Patent: Sep. 6, 2022

(54) BALANCING ARM WITH FRICTION HINGE

(71) Applicant: VLAAR INNOVATIONS B.V., Midwoud (NL)

(72) Inventor: Erik Jacobus Vlaar, Midwoud (NL)

(73) Assignee: VLAAR INNOVATIONS B.V., Midwoud (NL)

( * ) Notice: Subject to any disclaimer, the term of this patent is extended or adjusted under 35 U.S.C. 154(b) by 0 days.

(21) Appl. No.: 17/429,588

(22) PCT Filed: Jan. 30, 2020

(86) PCT No.: PCT/NL2020/000001
§ 371 (c)(1),
(2) Date: Aug. 9, 2021

(87) PCT Pub. No.: WO2020/167113
PCT Pub. Date: Aug. 20, 2020

(65) Prior Publication Data
US 2022/0136647 A1    May 5, 2022

(30) Foreign Application Priority Data
Feb. 11, 2019   (NL) .................................... 1043149

(51) Int. Cl.
*E04G 3/00* (2006.01)
*F16M 13/02* (2006.01)
*F16C 11/06* (2006.01)

(52) U.S. Cl.
CPC ........... *F16M 13/022* (2013.01); *F16C 11/06* (2013.01); *F16M 2200/044* (2013.01)

(58) Field of Classification Search
CPC .. F16M 13/022; F16M 2200/044; F16C 11/06

USPC ..... 248/274.1, 276.1, 281.11, 288.31, 284.1; 403/56, 76, 90, 52, 110, 114, 122
See application file for complete search history.

(56) References Cited

U.S. PATENT DOCUMENTS

| | | | | |
|---|---|---|---|---|
| 5,505,424 A | * | 4/1996 | Niemann | F16M 13/02 248/585 |
| 6,394,403 B1 | * | 5/2002 | Hung | F16M 13/022 248/278.1 |
| 6,672,553 B1 | * | 1/2004 | Lin | F16M 11/2064 248/921 |

(Continued)

OTHER PUBLICATIONS

International Search Report and Written Opinion issued in PCT/NL2020/000001, dated Jul. 20, 2020, 8 pages provided.

*Primary Examiner* — Todd M Epps
(74) *Attorney, Agent, or Firm* — Hamre, Schumann, Mueller & Larson, P.C.

(57) ABSTRACT

A balancing arm, comprising a folding arm that extends between a first end that is held in position, and a second end on which a load is carried, a first folding arm portion that extends from the first end of the folding arm being pivotably connected via a hinge to a second folding arm portion that extends to the second end of the folding arm. The balancing arm further comprises a balancing force device that is arranged to act between the first and second ends of the folding arm across the friction hinge to balance the load carried on the second end of the folding arm. The friction hinge is embodied as a friction hinge with adjustable friction, and includes a head and a socket arranged to pivot relative to each other when the folding arm portions pivot.

19 Claims, 9 Drawing Sheets

(56) References Cited

U.S. PATENT DOCUMENTS

| | | | | |
|---|---|---|---|---|
| 11,002,402 B2* | 5/2021 | Vlaar | ................ | F16M 11/2014 |
| 11,137,105 B2* | 10/2021 | Vlaar | ................ | F16M 11/2014 |
| 2011/0147546 A1* | 6/2011 | Monsalve | .......... | F16M 11/2014 |
| | | | | 248/122.1 |

* cited by examiner

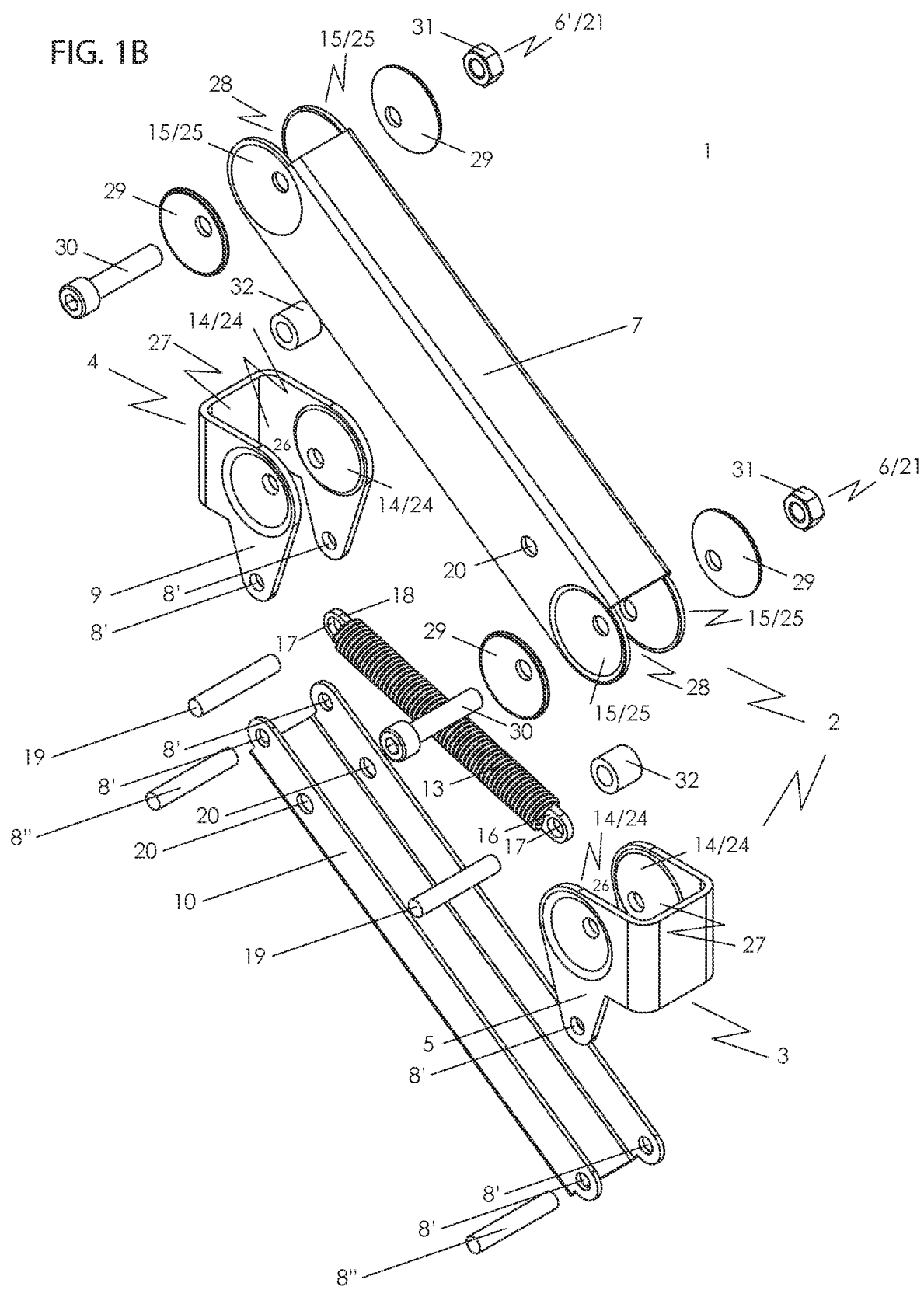

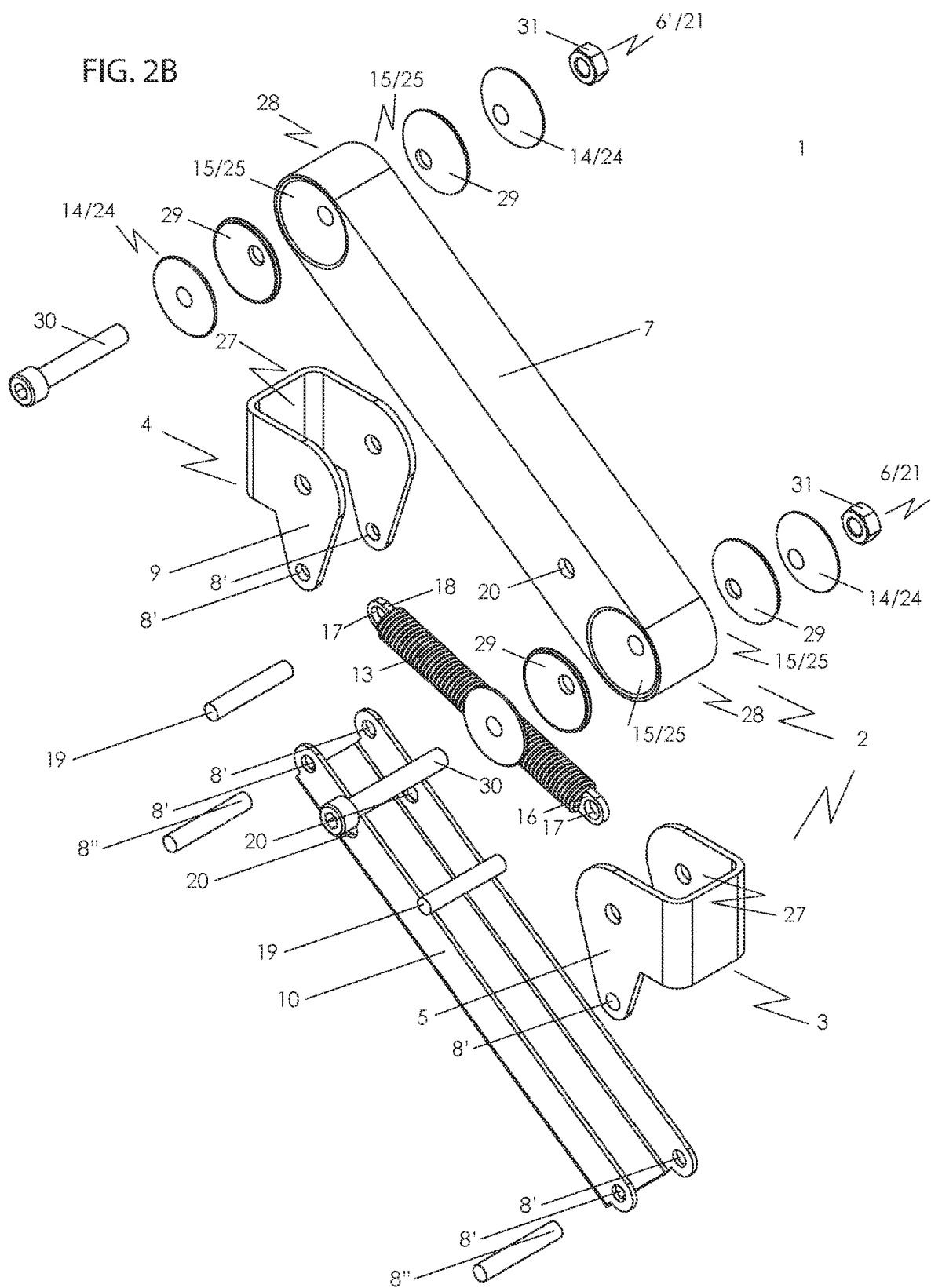

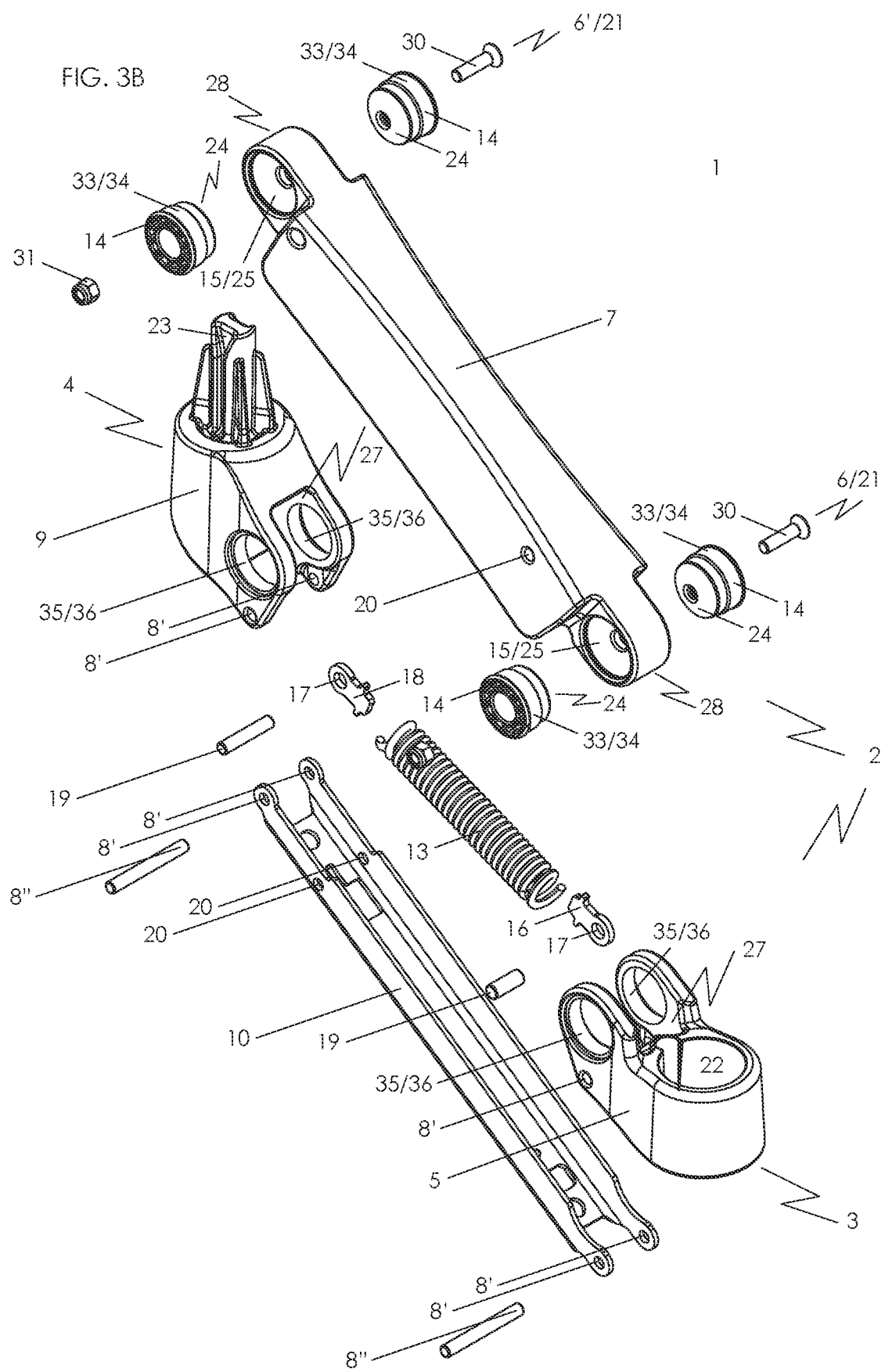

BALANCING ARM WITH FRICTION HINGE

BACKGROUND

1. Technical Field

The invention relates to a balancing arm with a friction hinge. Balancing arms are well known, and have traditionally been used in counterbalanced desk lamps. A particularly useful application of a balancing arm is in a monitor arm stand.

2. Description of Related Art

A balancing arm, also known as a floating arm or a counterbalanced arm, is a folding arm that is adjustable in position and that is constructed so that the load on the folding arm is counteracted by a balancing force device included in the folding arm, regardless of the position of the folding arm. The folding arm can be moved into a desired position, and the balancing force device is used to maintain that desired position until the folding arm is moved again.

A balancing arm typically comprises a folding arm that extends between a first end that is held in position, and a second end on which a load is carried, e.g. a computer display monitor. A first folding arm portion extends from the first end of the folding arm and is pivotably connected via a hinge to a second folding arm portion that extends to the second end of the folding arm. A balancing force device, e.g. a coil spring, is arranged to act between the first and second ends of the folding arm across the hinge to balance the load carried on the second end of the folding arm.

The hinge may for some types of balancing arms be embodied as a friction hinge, so that the friction cancels out the varying differences between the load and the balancing force of the balancing force device across a range of adjustment of the folding arm. The friction hinge provides a threshold that prevents the second end of the folding arm from moving when the balancing force is too high or too low for a specific load.

Preferably, the friction hinge may be embodied as an adjustable friction hinge, i.e. a friction hinge of which the amount of friction can be set. This way, the threshold of friction can be set so that only the amount of friction is used that is needed for balancing an actual load across a range of adjustment of the folding arm.

A difficulty with an adjustable friction hinge in a balancing arm, is that the pivoting of the ends of the folding arm about the friction hinge while under load of the balancing force device causes issues of wear and play, and requires specific measures to prevent that pivoting may loosen the screw clamp connection used to set the amount of friction and may cause collapse of the loaded friction hinge. Assembly, while under load of the balancing force device, is another difficulty. This assembly needs the space in or through which a fastener can or does move. After assembly this space results in play within the balancing arm.

For this, typically a set of accurately machined cylindrical steel bushings is provided that have flattened sides to be non-rotably held in mounting holes with flattened sides in one folding arm portion, and which form a cylindrical bearing surface for the other folding arm portion. The bushings are provided with radially extending friction plates, either integrally formed on the bushings or carried thereon as separate parts. The friction plates include radially extending, planar friction surfaces that are clamped against the sides of the folding arm, either directly or via friction washers held on the bushings. The clamping is done by a screw clamp connection that traverses a bore in one of the bushings, and that is held in an internal thread in the other bushing. The screw clamp connection is turned until its head rests on the outer face of the friction plate of the bushing with the bore, and the friction plates provide the friction hinge with a desired amount of friction when the folding arm portions pivot relative to each other about the friction hinge.

A disadvantage of the known adjustable friction hinge is that it is relatively complex and costly to manufacture, and still has issues with assembly and play.

SUMMARY

The invention aims to alleviate the disadvantages of the prior art. In particular, the invention aims to provide for a friction hinge that is less complex, less expensive, less difficult to assemble and/or provides less play. Thereto, the invention provides for a balancing arm, comprising a folding arm that extends between a first end that is held in position, and a second end on which a load is carried, a first folding arm portion that extends from the first end of the folding arm being pivotably connected via a friction hinge to a second folding arm portion that extends to the second end of the folding arm, further comprising a balancing force device that is arranged to act between the first and second ends of the folding arm across the friction hinge to balance the load carried on the second end of the folding arm, wherein the friction hinge is embodied as a friction hinge with adjustable friction, characterized in that the friction hinge includes a head and a socket arranged to pivot relative to each other when the folding arm portions pivot, and a screw clamp connection extending across the friction hinge to cause the head and the socket to be engaged, the head comprising a tapered contact surface that cooperates with a correspondingly shaped tapered contact surface of the socket in a self-releasing clamp connection, the contact surfaces simultaneously each forming both a bearing surface and a friction surface for the friction hinge.

By providing the friction hinge with a head and a socket with self-releasing cooperating tapered contact surfaces that simultaneously form a bearing and a friction surface, the construction may include less parts, may be self-centering in shape, may be practically without play, and may have an increased contact surface to distribute the load.

Within this context, a self-releasing clamp connection of the contact surfaces is to be understood as a taper that is shaped so that the contact surfaces will not stick into each other without the clamp connection holding it there. Typically, a tapered shape with an angle of declination of the surface towards the tip of more than 45 degrees will be self-releasing.

The tapered contact surface of the head may in particular comprise or form a male contact surface, and the correspondingly shaped contact surface of the socket may comprise or form a female contact surface.

Preferably, the tapered contact surface is convex, and the correspondingly shaped tapered contact surface is concave. The taper of the contact surface may be a curved taper, and the contact surface may e.g. be shaped as a hemisphere or as a section of a sphere. As an alternative, the taper may be linear, and may e.g. be shaped as a cone or as a section of a cone. The curved taper may include a varying radius of curvature, and may e.g. have a radius of curvature that increases towards the small end. The curved taper may also include a constant radius, preferably a constant radius of curvature with a center of curvature that is offset from a main axis of the taper. In cross section, a top and a bottom portion of the taper may be connected via a flat nose portion of the taper.

When at least one of the contact surfaces, but preferably both, is/are formed as a continuous surface of a body of rotation, manufacturing may be simplified further, and the contact surface area may be optimized.

When at least one of the contact surfaces is integrally formed with a folding arm portion, manufacturing and assembly may be further facilitated. For example, the contact surface of the head may be integral with one folding arm portion, and the contact surface of the socket may be integral with the other folding arm portion. The socket may e.g. be integrally formed in a die-cast folding arm portion, and the head may be integrally formed in a pressed steel sheet folding arm portion.

When the friction hinge comprises a set of interspaced heads facing each other, and matching sockets in interspace between, the self-centering capacity of the friction hinge may be increased further. The heads may e.g. be carried on facing sides of a yoke on a first folding arm portion, and the sockets may be carried on opposing sides of a boom end of a second folding arm portion that is held in the yoke, and a bolt may be provided that crosses the yoke and the boom end.

By arranging the male and female contact surfaces to be in direct contact, the part count may be reduced further. As an alternative, e.g. to prevent seizure, the male and female contact surfaces may be in indirect contact via a shim that is interposed between the contact surfaces.

When the head, socket or shim is made of plastics material, friction and wear may be controlled more easily, and a conformity of the cooperating surfaces may be achieved by deformation of the material without the need for precise manufacturing.

Further advantageous embodiments are set out in de dependent claims.

BRIEF DESCRIPTION OF THE DRAWINGS

The invention will be further elucidated on the basis of an exemplary embodiment which is represented in a drawing. In the drawings:

FIG. 1b shows an exploded view of the balancing arm of FIG. 1a;

FIG. 1c shows a schematic cross sectional view of the friction hinge of the balancing arm of FIG. 1a;

FIG. 2b shows an exploded view of the balancing arm of FIG. 2a;

FIG. 2c shows a schematic cross sectional view of the friction hinge of the balancing arm of FIG. 2a;

FIG. 3b shows an exploded view of the balancing arm of FIG. 3a, and

FIG. 3c shows a schematic cross sectional view of the friction hinge of the balancing arm of FIG. 3a.

It is noted that the figures are merely schematic representations of a preferred embodiment of the invention, which is given here by way of non-limiting exemplary embodiment. In the description, the same or similar part and elements have the same or similar reference signs.

DETAILED DESCRIPTION OF THE EMBODIMENTS

Figure 1A:
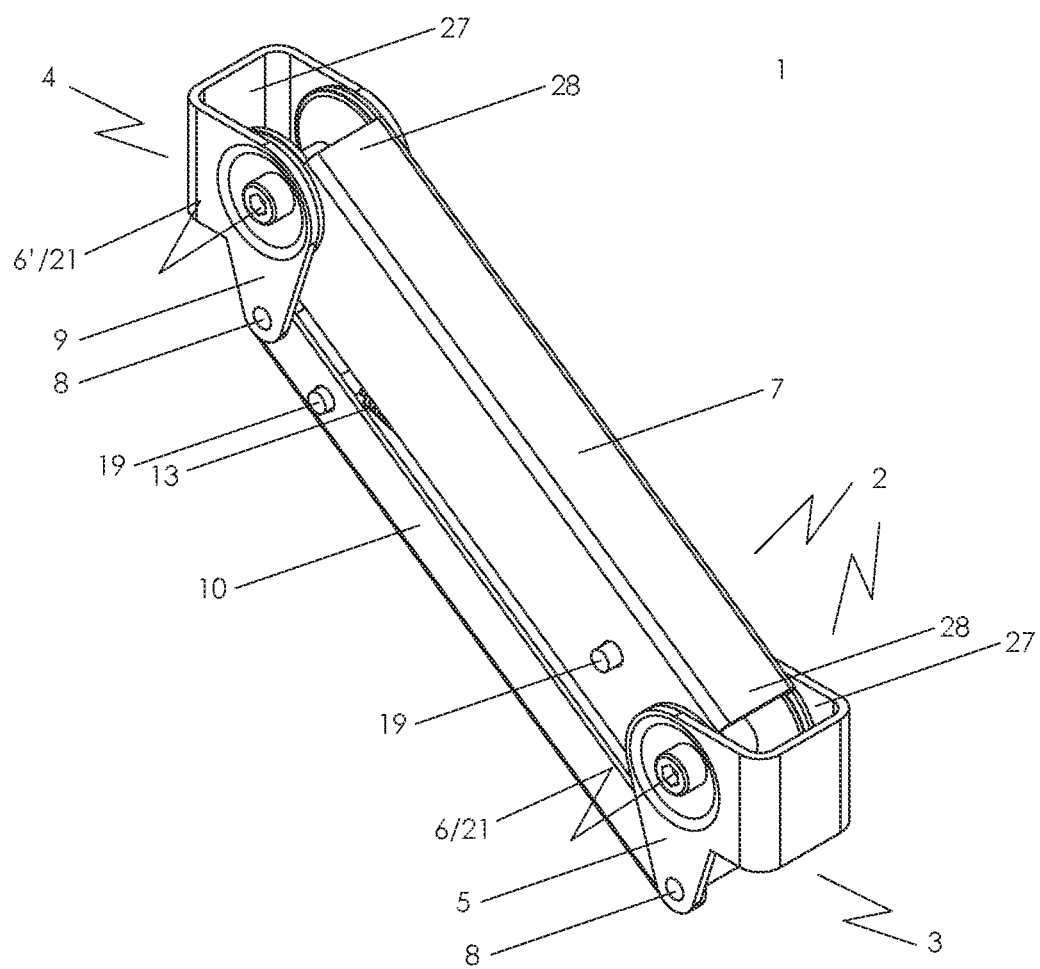
FIG. 1a shows a schematic perspective view of a first embodiment of a balancing arm according to the invention.
Figure 1C:
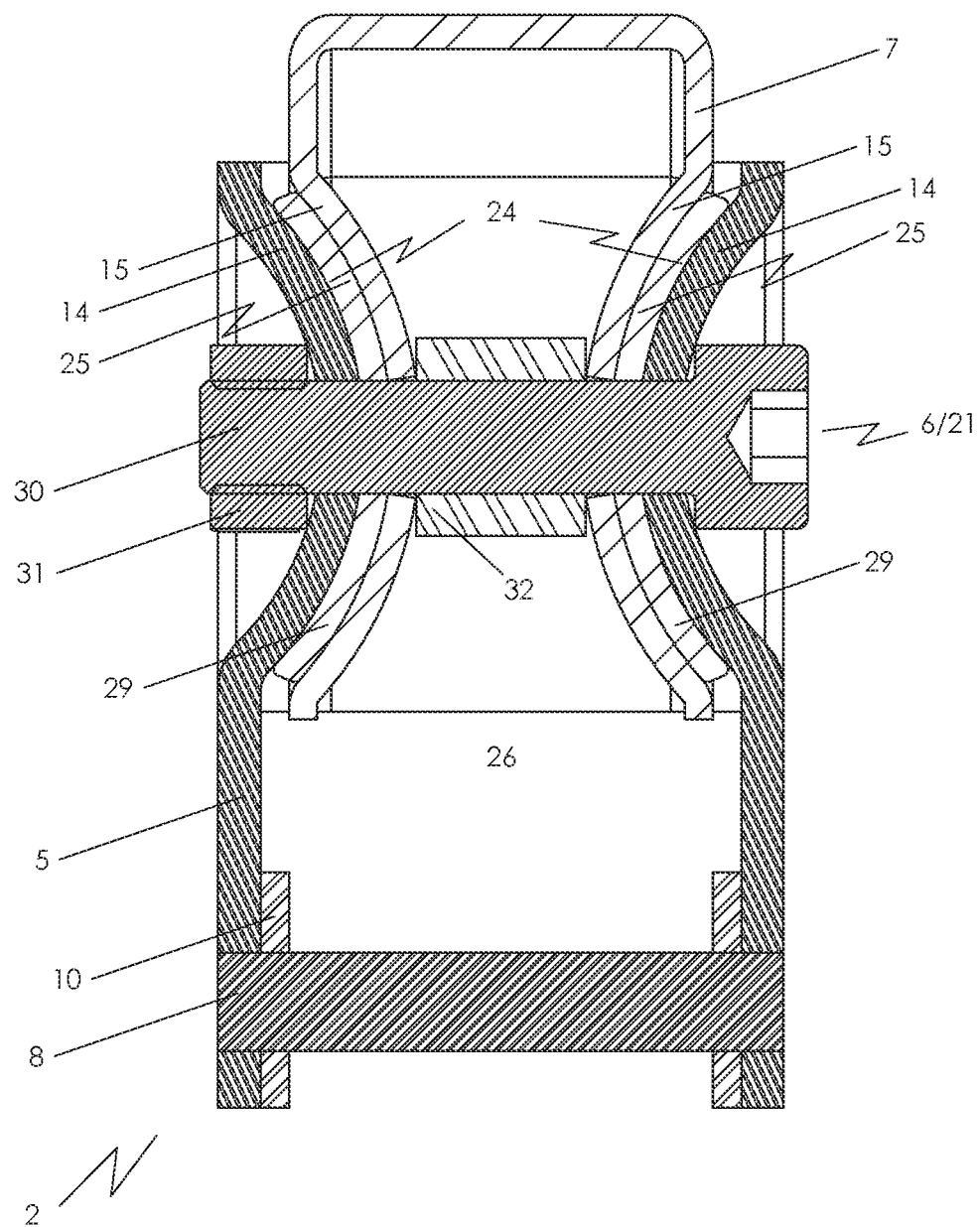

FIGS. 1a-1c show a first embodiment of a balancing arm 1 in accordance with the invention. The balancing arm 1 comprises a folding arm 2 that extends between a first end 3 that is held in position, and a second end 4 on which a load is carried. Typically, the first end 3 may be held on a clamp on a desk, and the second end 4 may carry a VESA mount of a computer display monitor, so that the monitor may be adjusted in height relative to a desk.

A first folding arm portion 5 of the folding arm 2 extends from the first end 3 of the folding arm 2 and is pivotably connected via a friction hinge 6 to a second folding arm portion 7 of the folding arm 2. The second folding arm portion 7 extends to the second end 4 of the folding arm 2. The friction hinge 6 in the folding arm 2 allows angular adjustment of the first folding arm portion 5 of the folding arm 2 relative to the second folding arm portion 7 of the folding arm 2, and thus positional adjustment of the second end 4 of the folding arm 2 relative to the first end 3 of the folding arm 2.

In this embodiment, the balancing arm 1 comprises further folding arm portions, and further hinges. In particular, it includes a third folding arm portion 9 and a fourth folding arm portion 10 that are arranged in parallel to the first folding arm portion 5 and the second folding arm portion 7 respectively to form or be part of a parallelogram, and three further hinges 6', 8. The parallelogram allows the first folding arm portion 5 and the third folding arm portion 9 to remain parallel during adjustment of the folding arm 2, so that a face of a computer display monitor carried as a load on the second end 4 of the folding arm 2 can stay in an upright plane during height adjustment. In this example, the folding arm portions 5, 7, 9, 10 are manufactured as pressed steel parts.

The balancing arm 1 further comprises a balancing force device 13. The balancing force device 13 is arranged to act between the first and second ends 3, 4 of the folding arm 2 across the friction hinge 6 to balance the load carried on the second end 4 of the folding arm 2. The balancing force device 13 is of the tensile type and is embodied as a coil spring. The coil spring extends diagonally between the second folding arm portion 7 and the fourth folding arm portion 10, and is arranged to pull the third folding arm portion 9, that is hingedly connected to both the second and fourth folding arm portions 7, 10, towards the first folding arm portion 5 across the friction hinge 6.

The coil spring 13 is in this embodiment mounted with a first end 16 directly to the second folding arm portion 7, and with a second end 18 directly to the fourth folding arm portion 10. Both the first end 16 and the second end 18 of the coil spring 13 are provided with a cylindrical mounting hole 17, which cooperates with mounting pins 19 that extend through cylindrical mounting holes 20 in both the second and fourth folding arm portions 7, 10.

As the position of the second end 4 of the folding arm 2 is adjusted, the moment exerted by the load exerted on the first end 3 of the folding arm 2 varies. In order to compensate for this, the coil spring 13 is arranged so that its balancing force, its operating length and/or its working line (i.e. its angle) varies in accordance with the variation of the angle that the friction hinge 6 makes between the first and second folding arm portions 5, 7.

The friction hinge 6 between the first and second folding arm portions 5, 7 of the folding arm 2 is in this exemplary embodiment embodied as a friction hinge 6 with adjustable friction, as is the friction hinge 6' between the second and third folding arm portions 7, 9. By adjustment of the amount of friction in the friction hinges 6, 6', the threshold of friction can be set, so that only the amount of friction is used that is needed for balancing an actual load across a range of adjustment of the folding arm 2.

The further friction hinges 8 between the third and fourth folding arm portions 9, 10 and between the fourth and first folding arm portions 10, 5 are in this embodiment formed as friction hinges with a fixed amount of friction, and are embodied as friction rivets which are held in corresponding rivet mounting holes 8' in folding arm portions 9, 10, 5.

The adjustable friction hinges 6, 6' include a head 14 and a socket 15 arranged to pivot relative to each other when the folding arm portions pivot, and a screw clamp connection 21 extending across the friction hinge to cause the head 14 and the socket 15 to be engaged. By tightening and loosening of the screw clamp connection 21, the amount of friction generated in the friction hinge may be increased and decreased respectively.

The head 14 of the friction hinge comprises a male tapered contact surface 24 that cooperates with a correspondingly shaped female tapered contact surface 25 of the socket 15 in a self-releasing clamp connection. The male tapered contact surface 24 will not stick in the female tapered contact surface 25 without the screw clamp connection 21 holding it there, and can in such case loosen itself under a pivot load.

The contact surfaces 24, 25 each simultaneously form both a bearing surface and a friction surface for the friction hinge. This way, a relatively large contact area is provided to distribute the load and to generate friction using only two parts. In this example, both the male and the female tapered contact surfaces 24, 25 are integrally formed with the arm portions 5, 7, 9: during manufacture, they are provided as convex and concave pressed portions of the sheet metal folding arm portions 5, 7, 9 respectively.

The taper of the contact surfaces 24, 25 in this embodiment is a curved taper, and the contact surfaces 24, 25 are shaped as a section of a sphere. The contact surfaces 24, 25 are here both formed as a continuous surface of a body of rotation. The adjustable friction hinges 6, 6' comprise a set of interspaced heads 14 facing each other, and matching sockets 15 in the interspace 26 there between. The heads 14 are to be carried on facing sides of a yoke 27 on the first and third folding arm portions 5, 9, and the sockets 15 are carried on opposing sides of a boom end 28 of the second folding arm portion 7 that is held in the yokes 27.

The male and female contact surfaces 24, 25 are in indirect contact via a shim 29 of plastics material that is interposed between the contact surfaces, and that is used to control friction and wear, and conformity of the cooperating surfaces is achieved by deformation of the plastics material of the shim 29.

The screw clamp connection 21 comprises a standard threaded bolt 30 with a cylindrical body and a cylindrical drive head with an inner hexagonal drive aperture, and a standard nut 31, preferably with integrated friction ring. The bolt 30 crosses the yoke 27 and the boom end 28, and traverses through the two opposing heads 14, and though the interposed sockets 15. The bolt 30 further traverses a spacer 32 that is provided between the opposing sockets 15 to prevent that the sockets 15 can move towards each other by deformation of the cross section of the pressed steel of the second arm portion 7 at the boom ends 28 when the screw clamp connection 21 is tightened. By screwing the nut 31 and bolt 30 into each other, at one or both of the adjustable friction hinges 6, 6', the threshold of friction in the balancing arm 1 can be set so that only the amount of friction is used that is needed for balancing the weight of an actual computer display monitor carried on the balancing arm 1 across a range of adjustment of the balancing arm 1. After setting the friction in this way, the computer display monitor may be moved up or down with little adjustment force, and stays in place after adjustment.

Figure 2A:
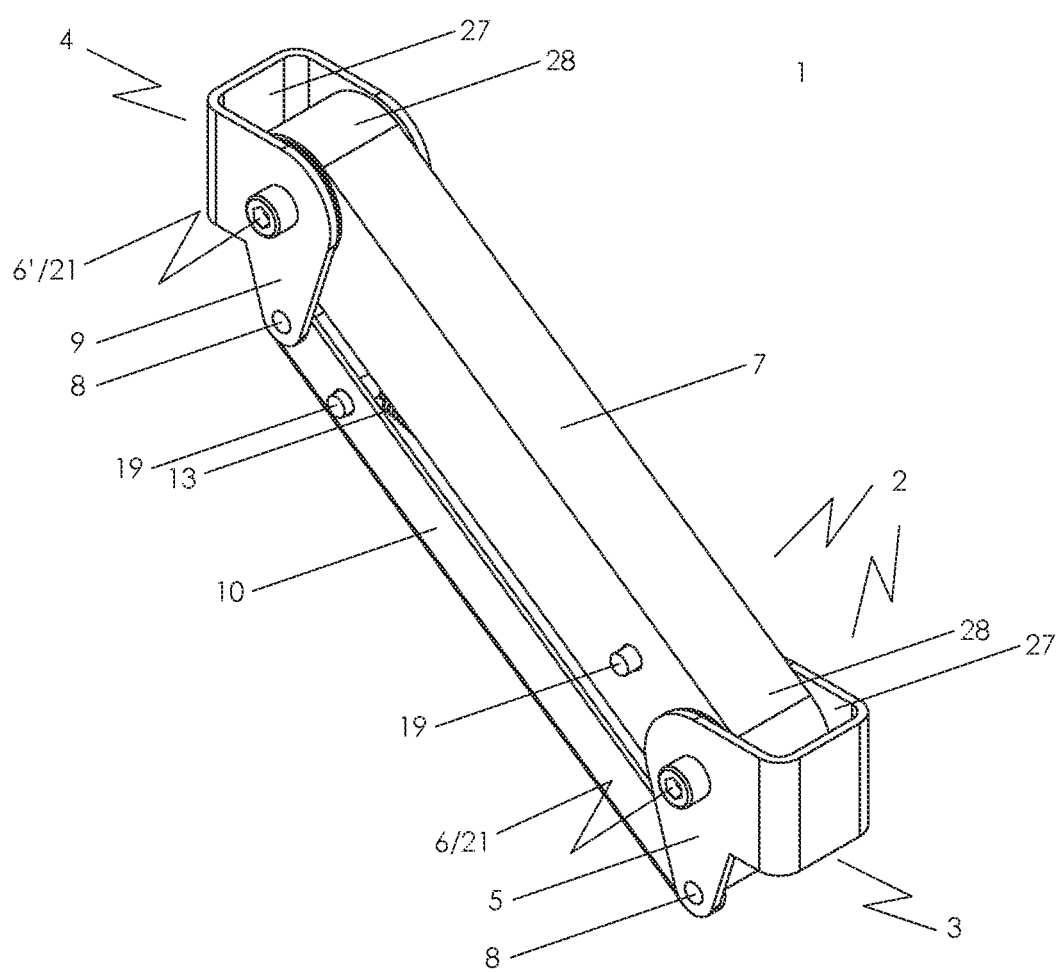
FIG. 2a shows a schematic perspective view of a second embodiment of a balancing arm according to the invention.
Figure 2C:
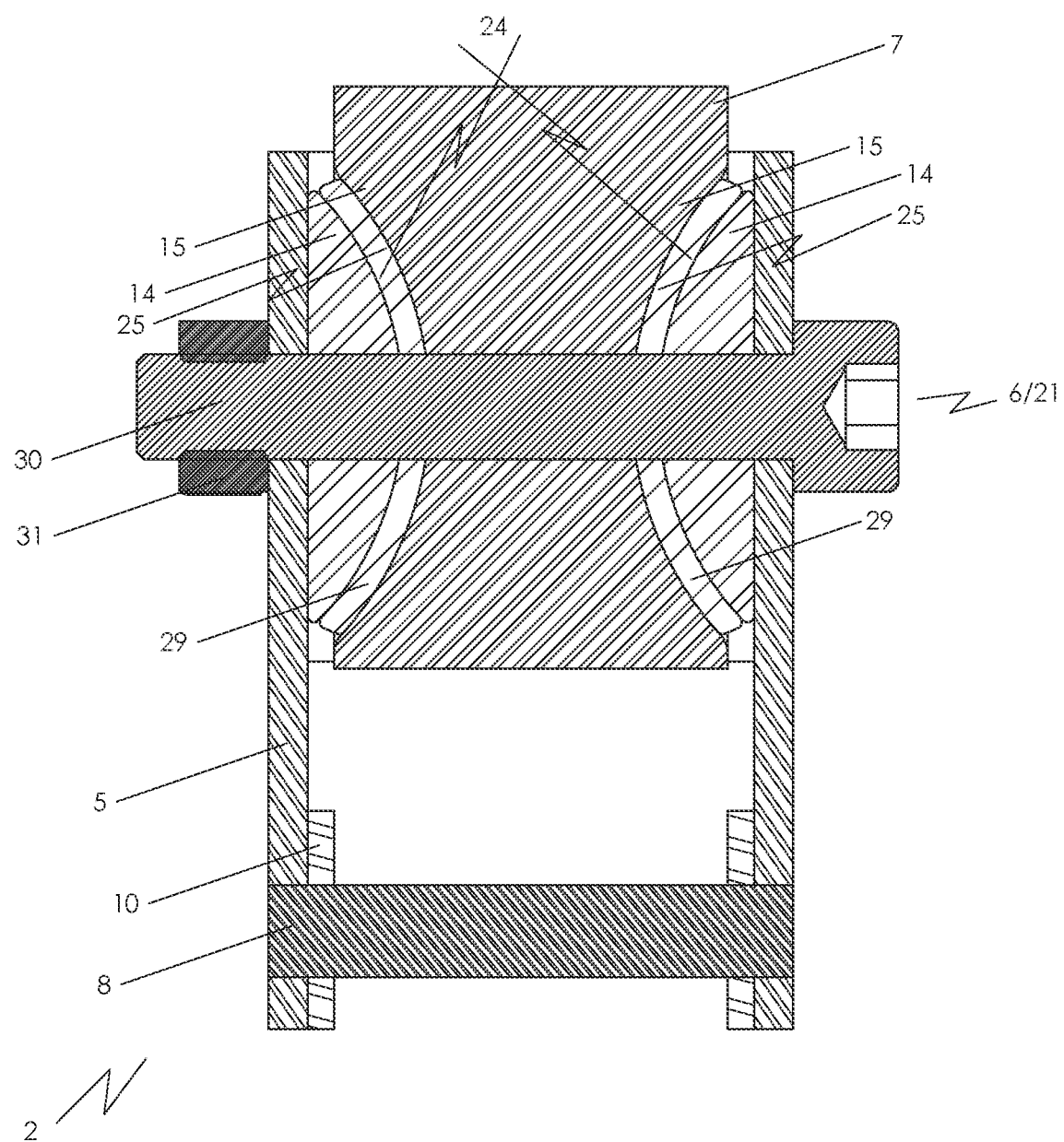

FIGS. 2a-2c shows a second embodiment of a balancing arm 1 in accordance with the invention. This embodiment has a similar configuration as the first embodiment. In this second embodiment, however, the second folding arm portion 7 is manufactured as a hollow die-cast folding arm portion, e.g. in cast aluminum. A set of sockets 15 with female taper 25 is here integrally formed when casting the arm. To facilitate assembly, a set of heads 14 with male taper 24 is provided as separate pieces instead of being integral with the yoke 27 of the first and third folding arm portions 5, 9. The separate heads 14 are carried on the bolts 30, and may if desired be secured against rotation on the yoke 27, e.g. with screws from the outer surface of the yoke 27 or with glue on the inner surface of the yoke 27. If desired, the shims 29 may be omitted, and the heads 14 may then e.g. be manufactured form a plastics material.

Figure 3A:
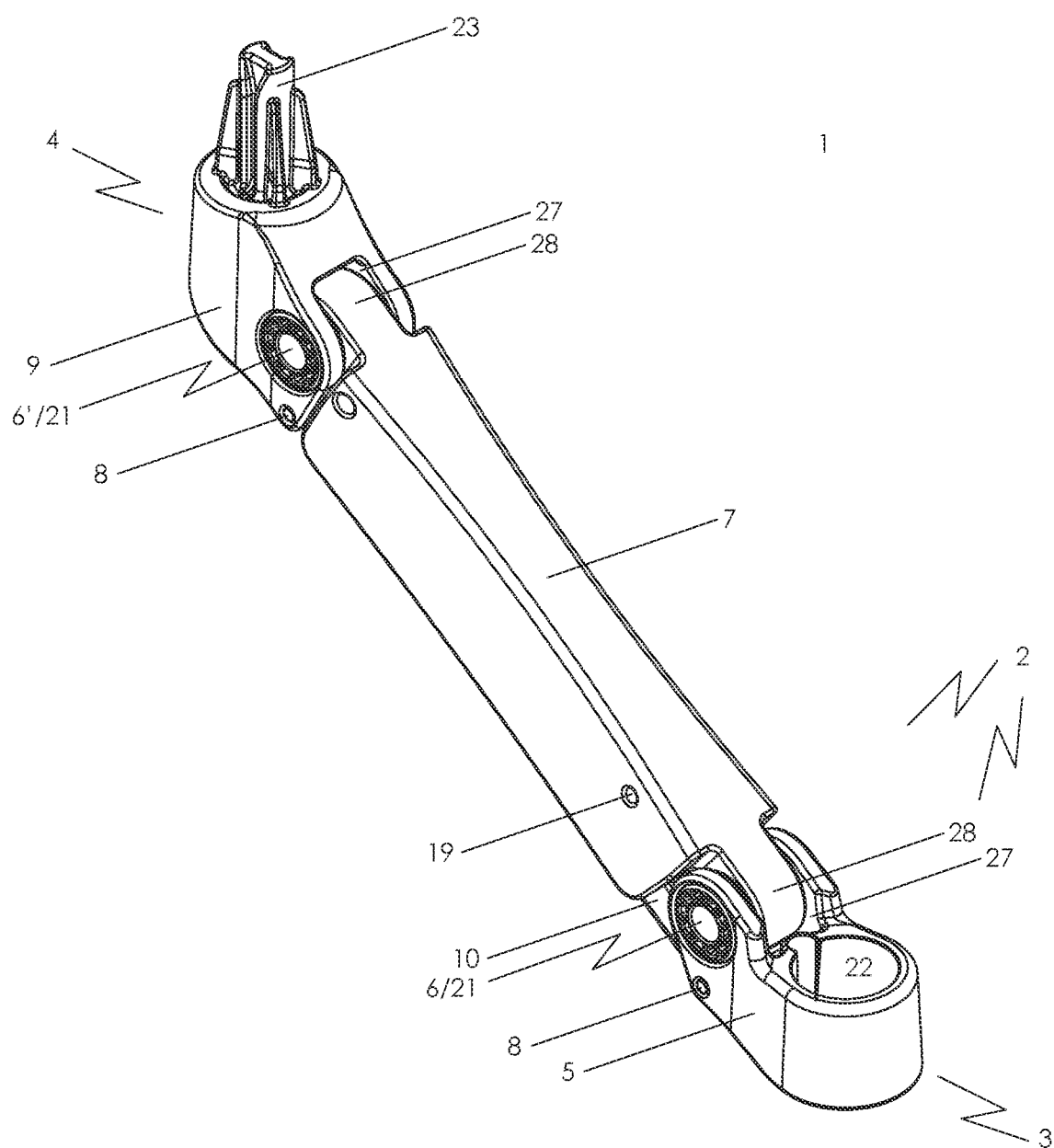
FIG. 3a shows a schematic perspective view of a third embodiment of a balancing arm according to the invention.
Figure 3C:
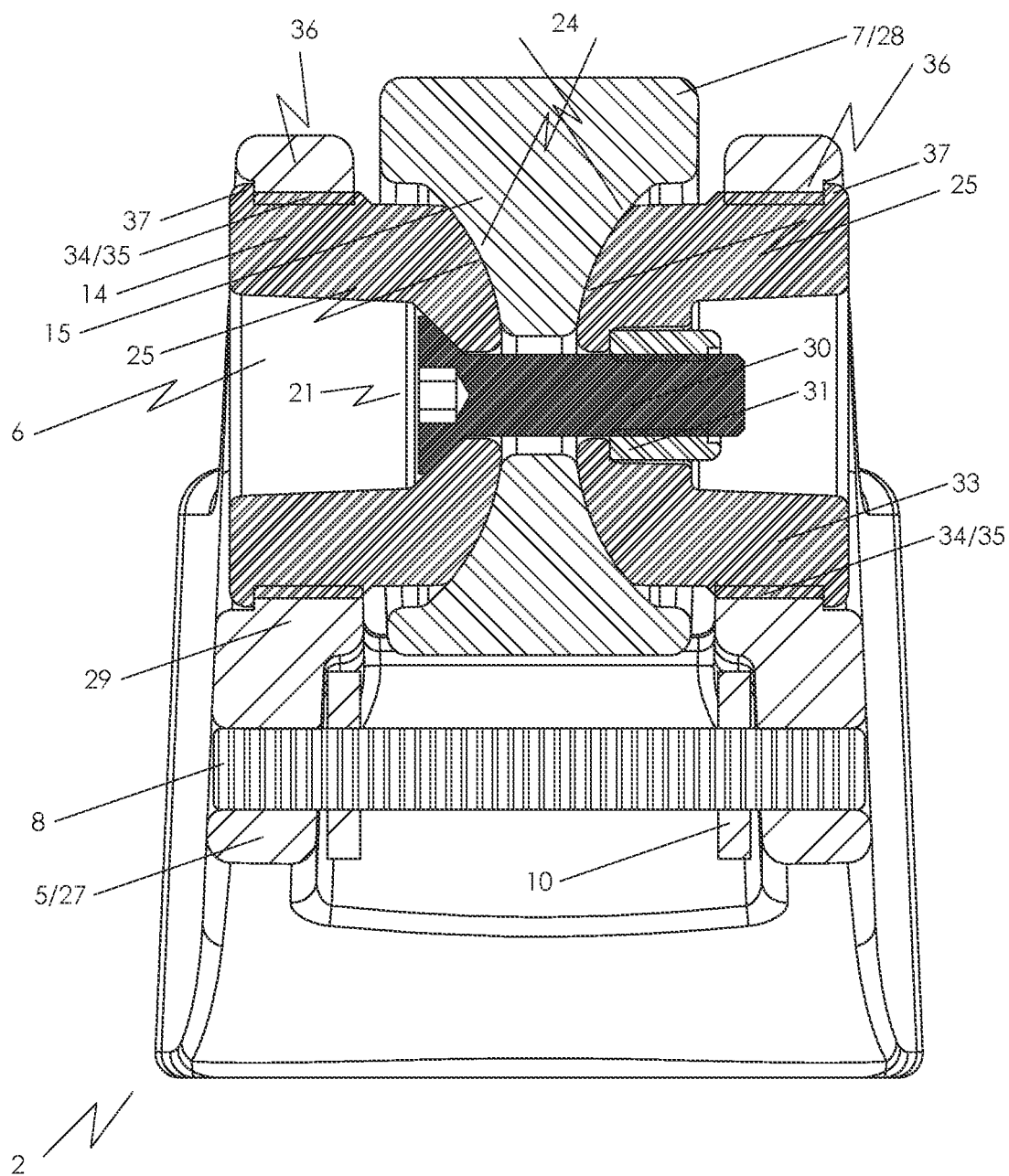

FIGS. 3a-3c show a third embodiment of a balancing arm 1 in accordance with the invention. In this embodiment, the first end 3 of the folding arm 2 is provided with a ring mount 22 to be carried on a post of a monitor arm stand (not shown), and the second end 4 is provided with an upright 23 to carry a VESA mount of a computer display monitor (not shown). The ring mount 22 and the upright 23 are integrally formed with the first and third folding arm portions 5, 9 respectively. The first, second and third folding arm portions 5, 7, 9 are here formed as aluminium die-cast parts. As in the second embodiment, the boom ends 28 of the second folding arm portion 7 are each provided with a set of integrally formed sockets 15 with female tapers 25

In this embodiment, the heads 14 are made of plastics material and comprise a cylindrical portion 33 with a left-handed screw thread 34 that engages a corresponding left-handed screw thread 35 in a mounting aperture 36 of the yoke 27 of the first and third folding arm portions 5, 9.

The cylindrical portions 33 are provided with an end stop 37, which prevents left-handed or counterclockwise rotation of the heads 14. Any accidental right-handed or clockwise rotation of the heads 14 is prevented by the right-handed clamp connection 21, i.e. any clockwise engagement on any head 14 is canceled out by opposing clockwise engagement on screw clamp connection 21.

The male and female tapers 24, 25 in this embodiment include a curved taper with a constant radius of curvature that has a center of curvature that is offset from a main axis of the taper. In cross section, a top and a bottom portion of the taper are connected via a flat nose portion of the taper. In this embodiment, the male and female tapers 24, 25 engage each other directly.

In assembly, the boom ends 28 are placed in the yokes 27, and the heads 14 are screwed into the mounting apertures 36 of the yokes 27 until the heads 14 engage the sockets 15 without play. Next, the clamping bolt 30 and nut 31 of the screw clamp connection 21 are placed, and the friction is set to the desired level. This can be done for each friction hinge 6, 6' by tightening the nut 31 of the clamping bolt 30 that crosses the friction hinge 6, 6' so that the male tapered contact surfaces 24 of heads 14 engage the female tapered contact surfaces 25 of sockets 15 in the first and third folding arm portions 5, 9 with stronger clamping force until the desired amount of friction is generated. In this embodiment, the adjustable friction hinges 6, 6' are located between the first and second folding arm portions 5, 7, and between the second and third folding arm portions 7, 9. The friction hinges 8 between the third and fourth folding arm portions 9, 10 and between the fourth and first folding arm portions 10, 5 of the parallelogram are embodied as friction rivets with fixed, preset friction, similar to the ones used in the first embodiment.

Thus is disclosed a balancing arm, comprising a folding arm that extends between a first end that is held in position, and a second end on which a load is carried, a first folding arm portion that extends from the first end of the folding arm being pivotably connected via a hinge to a second folding arm portion that extends to the second end of the folding arm. The balancing arm further comprises a balancing force device that is arranged to act between the first and second ends of the folding arm across the friction hinge to balance the load carried on the second end of the folding arm. The friction hinge is embodied as a friction hinge with adjustable friction, characterized in that the friction hinge includes a head 14 and a socket 15 arranged to pivot relative to each other when the folding arm portions pivot, and a screw clamp connection 21 extending across the friction hinge to cause the head 14 and the socket 15 to be engaged. The head 14 comprises a male tapered contact surface 24 that cooperates with a correspondingly shaped female tapered contact surface 25 of the socket 15 in a self-releasing clamp connection, and the contact surfaces 24, 25 each simultaneously form both a bearing surface and a friction surface for the friction hinge.

It is pointed out that the invention is not limited to the exemplary embodiments represented here, and that many variations are possible. For example, the friction hinge with adjustable friction may include only one set of a male tapered contact surface that cooperates with a correspondingly shaped female tapered contact surface of the socket in a self-releasing clamp connection.

Also, in the balancing arm, only one hinge may be embodied as a friction hinge with adjustable friction, and other hinges may be embodied as friction hinges with fixed friction, or as conventional hinges (i.e. hinges with low friction compared to a friction hinge). As an alternative, all hinges in the balancing arm may be embodied as friction hinges with adjustable friction. The balancing arm may include further folding arm portions, and further friction hinges.

Also, the balancing force device may be of the compression or expansion type, and may e.g. be arranged to push the folding arm portions away from each other across the friction hinge, or to pull the folding arm portions towards each other across the friction hinge. The balancing force device may e.g. be embodied as a gas spring or a coil spring.

These and other embodiments will be apparent to the person skilled in the art and are considered to lie within the scope of the invention as defined by the following claims.

LIST OF REFERENCE SIGNS

1. Balancing arm
2. Folding arm
3. First end of folding arm
4. Second end of folding arm
5. First folding arm portion
6. Friction hinge with adjustable friction
6'. Friction hinge with adjustable friction
7. Second folding arm portion
8. Further friction hinge
8'. Rivet mounting hole
8". Friction rivet
9. Third folding arm portion
10. Fourth folding arm portion
11. not used
12. not used
13. Balancing force device/spring
14. Head adjustable friction hinge
15. Socket adjustable friction hinge
16. First end of spring
17. Cylindrical mounting hole
18. Second end of spring
19. Mounting pin
20. Cylindrical mounting hole
21. Screw clamp connection
22. Ring mount
23. Upright
24. Male tapered contact surface/male taper
25. Female tapered contact surface/female taper
26. Interspace
27. Yoke
28. Boom end
29. Shim
30. Bolt
31. Nut
32. Spacer
33. Cylindrical portion
34. Screw thread
35. Screw thread
36. Mounting aperture
37. End stop

The invention claimed is:

1. A balancing arm, comprising a folding arm that extends between a first end that is held in position, and a second end on which a load is carried, a first folding arm portion that extends from the first end of the folding arm being pivotably connected via a friction hinge to a second folding arm portion that extends to the second end of the folding arm, further comprising a balancing force device that is arranged to act between the first and second ends of the folding arm across the friction hinge to balance the load carried on the second end of the folding arm, wherein the friction hinge is embodied as a friction hinge with adjustable friction, characterized in that the friction hinge includes a head and a socket arranged to pivot relative to each other when the folding arm portions pivot, and a screw clamp connection extending across the friction hinge to cause the head and the socket to be engaged, the head comprising a tapered contact surface that cooperates with a correspondingly shaped tapered contact surface of the socket in a self-releasing clamp connection, the tapered contact surfaces simultaneously each forming both a bearing surface and a friction surface for the friction hinge.

2. The balancing arm of claim 1, wherein at least one of the tapered contact surfaces is formed as a continuous surface of a body of rotation.

3. The balancing arm of claim 1, wherein at least one of the tapered contact surfaces is integrally formed with a folding arm portion.

4. The balancing arm of claim 1, wherein the friction hinge comprises a set of interspaced heads facing each other, and matching sockets in the interspace between.

5. The balancing arm of claim 1, wherein the tapered contact surfaces are in direct contact.

6. The balancing arm of claim 1, wherein at least one of the head or socket is made of plastics material.

7. The balancing arm of claim 1, wherein the head comprises a cylindrical portion with a screw thread that engages a corresponding screw thread in a mounting aperture of a folding arm portion.

8. The balancing arm of claim 1, wherein the screw clamp connection comprises a standard threaded bolt and nut.

9. The balancing arm of claim 1, wherein the balancing arm includes a third folding arm portion and a fourth folding arm portion that are arranged in parallel to the first folding arm portion and the second folding arm portion respectively to form or be part of a parallelogram, and three further friction hinges between second and third, third and fourth, and fourth and first folding arm portions respectively.

10. The balancing arm of claim 1, wherein a taper of the tapered contact surface is a curved taper.

11. The balancing arm of claim 10, wherein the curved taper includes a varying radius of curvature, or a constant radius of curvature with a center of curvature that is offset from a main axis of the curved taper.

12. The balancing arm of claim 1, wherein the tapered contact surface is convex, and wherein the correspondingly shaped tapered contact surface is concave.

13. The balancing arm of claim 12, wherein at least one of the tapered contact surfaces is integrally formed with a folding arm portion.

14. The balancing arm of claim 12, wherein the tapered contact surfaces are in direct contact.

15. The balancing arm of claim 12, wherein the balancing arm includes a third folding arm portion and a fourth folding arm portion that are arranged in parallel to the first folding arm portion and the second folding arm portion respectively to form or be part of a parallelogram, and three further friction hinges between second and third, third and fourth, and fourth and first folding arm portions respectively.

16. The balancing arm of claim 1, wherein the tapered contact surface of the head comprises a male contact surface and wherein the correspondingly shaped contact surface of the socket comprises a female contact surface.

17. The balancing arm of claim 16, wherein at least one of the tapered contact surfaces is integrally formed with a folding arm portion.

18. The balancing arm of claim 16, wherein the tapered contact surfaces are in direct contact.

19. The balancing arm of claim 16, wherein the balancing arm includes a third folding arm portion and a fourth folding arm portion that are arranged in parallel to the first folding arm portion and the second folding arm portion respectively to form or be part of a parallelogram, and three further friction hinges between second and third, third and fourth, and fourth and first folding arm portions respectively.

\* \* \* \* \*